United States Patent [19]

Bhatia

[11] 4,374,940

[45] Feb. 22, 1983

[54] ANAEROBIC COMPOSITIONS

[75] Inventor: Yog R. Bhatia, Glen Ellyn, Ill.

[73] Assignee: The Henkel Corporation, Minneapolis, Minn.

[21] Appl. No.: 274,106

[22] Filed: Jun. 16, 1981

[51] Int. Cl.³ .............................. C08F 2/38; C08F 4/28; C08F 22/06
[52] U.S. Cl. .................................... 523/176; 524/854; 526/217; 526/220; 526/323.1
[58] Field of Search ..................... 526/323.1, 217, 220; 260/42.52; 523/176

[56] References Cited

U.S. PATENT DOCUMENTS

| | | | |
|---|---|---|---|
| 2,628,178 | 2/1953 | Burnett et al. | 526/320 |
| 2,895,950 | 7/1959 | Krieble | 526/323.1 |
| 3,041,322 | 6/1962 | Krieble | 526/323.1 |
| 3,043,820 | 7/1962 | Krieble | 526/320 |
| 3,218,305 | 11/1965 | Krieble | 526/323.1 |
| 3,987,234 | 10/1976 | Gruber et al. | 526/323.1 |
| 4,038,475 | 7/1977 | Fraenglass et al. | 526/323.1 |
| 4,180,640 | 12/1979 | Melody et al. | 526/323.1 |
| 4,215,209 | 7/1980 | Ray-Chaudhuri et al. | 526/323.1 |
| 4,245,077 | 1/1981 | De Marco | 526/323.1 |

*Primary Examiner*—Stanford M. Levin
*Attorney, Agent, or Firm*—Forrest L. Collins

[57] ABSTRACT

Anaerobic compositions are disclosed which employ meta-toluidine compounds as activators.

12 Claims, No Drawings

ANAEROBIC COMPOSITIONS

BACKGROUND OF THE INVENTION

1. Field of the Invention

This invention relates to compositions which cure under anaerobic conditions.

2. Description of the Art Practices.

It has long been known that such compositions which will cure under anaerobic conditions may be prepared. Such compositions may be used for locking bolts onto nuts to guard against vibration loosening of the nut. Recently, great interest has been placed in anaerobic curing compositions for use as sealants. That is, the sealant area of activity utilizing anaerobic adhesives is a replacement for conventional rubber plastic gaskets in applications such as pumps and internal combustion engines.

The anaerobic adhesive compositions of the prior art function as follows. First, a polymerizable component is employed which will upon proper activation polymerize. Materials such as cumene hydroxide are often utilized to initiate the reaction in the polymerizable component which may be conveniently a methacrylate or acrylate compond. Ordinarily, such compositions would be inherently unstable due to the presence of the polymerizable bond and the free radical initiator within the composition. To overcome this problem, the art has suggested using materials which are stabilizing inhibitors. The stabilizing inhibitors, generally quinone compounds, act as a free radical sink thereby picking up free radicals generated by the initiator thus stabilizing the composition. A complementary method of stabilizing anaerobic curing compositions is to allow air to permeate the container in which the composition is stored. The oxygen molecules in the air have the capability to act as a free radical sink in addition to the stabilizing inhibitor. There is, however, a penalty for allowing air to permeate the container of the anaerobic composition which is that such containers are considerably more expensive than lined metal pails. In most cases, plastics having a high degree of porosity are employed to obtain benefit of oxygen permeation.

There is also a difficulty in utilizing the stabilizing inhibitors such as quinones in an anaerobic composition. This difficulty stems from the fact that the stabilizing inhibitor does not know when it is supposed to cease its inhibiting function. By definition, the oxygen as a free radical sink is excluded when the adhesive function or the sealant is formed. However, the stabilizing inhibitor being a portion of the composition is always present and to the extent it has not been depleted by the free radials will still serve to inhibit the composition when the cure is attempted. Thus, a slight overuse of the stabilizing inhibitor can prevent the composition from curing. Moreover, the anaerobic compositions tend to be stored for varying periods of time by customers. Thus, if the initial level of the stabilizing inhibitor is set too high or too low, the anaerobic cure becomes haphazard. Thus, an ideal anaerobic curing system would avoid the use of stabilizing inhibitors if at all possible.

As noted previously the anaerobic compositions most often include a chemical compound capable of generating free radicals (it should also be noted that it is possible through the use of various forms of radiation to generate free radicals without the use of chemical compounds). The chemical compounds capable of forming the free radical are not only themselves inherently unstable but also will begin to liberate the free radical thereby promoting polymerization almost immediately after addition to the composition. Some free radical generators are not practically usable due to their inherent ability to gel the anaerobic composition even in the absence of anaerobic conditions.

What is most often used in the industry is a material such as cumene hydroperoxide which is not the strongest free radical initiator available. To step up the ability of the free radical initiator in curing the anaerobic composition, and thereby overcoming any remaining stabilizing inhibitor, accelerators are utilized. Accelerators are materials which have the function of a catalyst wherein the free radical initiator is caused to liberate the free radicals on a rapid basis. Such materials known in the art include sulfimides and tertiary amine compounds. In particular, combinations of the sulfimides and tertiary amine compounds appear to cause a synergy when present with a material such as cumene hydroperoxide under anaerobic conditions. Thus, the sulfimides and tertiary amines do not appear to inherently destabilize the composition in the absence of anaerobic conditions.

Of the various attempts in the art to find suitable components for anaerobic compositions is U.S. Pat. No. 4,038,475 issued to Frauenglass et al. on July 26, 1977. This patent describes the use of metal chelating agents to assist in stabilizing the anaerobic adhesive composition. U.S. Pat. No. 3,041,322 issued to Krieble on June 26, 1962 discloses various polymerizable compounds useful in anaerobic compositions.

It is also recommended that the reader review U.S. Pat. No. 3,218,305 issued Nov. 16, 1965 to Krieble as well as U.S. Pat. No. 2,895,950 issued July 21, 1959 also to Krieble.

U.S. Pat. No. 3,043,820 issued July 10, 1962 also contains teachings of Krieble relating to polymers for use in anaerobic compositions. It is also suggested that the patent to Burnett issued Feb. 10, 1953 as U.S. Pat. No. 2,628,178 be reviewed. Further references include U.S. Pat. No. 4,180,640 issued to Melody et al. on Dec. 25, 1979; U.S. Pat. No. 4,245,077 issued to DeMarco Jan. 13, 1981; and U.S. Pat. No. 3,987,234 issued to Gruber et al. on Oct. 19, 1976.

The foregoing patents to the extent applicable are herein incorporated by reference and made a part of the disclosure of this patent. Throughout the specification and claims, percentages and ratios are given by weight and temperatures are in degrees Celsius unless otherwise indicated.

SUMMARY OF THE INVENTION

The present invention describes an anaerobic curing composition comprising a compound capable of curing under anaerobic conditions, the improvement thereon comprising including in the composition a member selected from the group consisting of a meta-dialkyl substituted toluidines wherein the alkyl groups are selected from the groups consisting of ethyl, n-propyl, isopropyl, n-butyl, 1-methyl propyl and 2-methyl propyl and mixtures thereof said composition being substantially free of a stabilizing inhibitor.

DETAILED DESCRIPTION OF THE INVENTION

The first component required to make an anaerobic composition such as is utilizable as an anaerobic adhesive or an anaerobic sealant is a polymerizable monomer. The polymerizable monomer may be any component which is capable of forming a polymer under anaerobic conditions utilizing some source of free radical to initiate propagation. Such materials are well known in the art and it is suggested that in particular U.S. Pat. No. 4,038,465 be reviewed with regard to its discussion of polymerizable monomers said patent having been previously incorporated herein by reference. In particular, the highly preferred polymerizable monomer will be a polymerizable polyacrylate ester which is selected from the group consisting of diethleneglycoldimethacrylate; triethyleneglycol dimethacrylate; tetraethyleneglycol dimethacrylate; dipropyleneglycol dimethacrylate; polyethyleneglycol dimethacrylate; polypropyleneglycol dimethacrylate; di (pentamethyleneglycol) dimethacrylate; tetraethyleneglycol diacrylate; tetraethyleneglycol di(chloroacrylate); diglycerol diacrylate; diglycerol tetramethacrylate; tetramethylene dimethacrylate; ethylene dimethacrylate; butyleneglylcol dimethacrylate; neopentyglycol diacrylate; and trimethylopropane triacrylate and mixtures thereof. In particular, a highly preferred component is tetraethyleneglycol dimethacrylate having an average molecular weight of from about 250 to about 500.

The polymerizable monomers are conveniently used in the composition at from about 50 percent to about 99.5 percent, preferably from about 60 percent to about 96 percent by weight of the composition. The polymerizable monomers are commercially available materials usually containing traces of hydroquinone, a dihydric phenol.

The next component of the present invention is the free radical initiator. These compounds are conveniently peroxy, hydroperoxy, or peresters which are known to decompose to hydroperoxides in situ.

Conveniently, the organic hydroperoxide which may be used in the present invention are those materials which are known in the art. Typical examples of such organic hydroperoxides are comene hydroperoxide, tertiary butylhydroperoxide, methylethylketone hydroperoxide, and hydroperoxides formed by oxygenation of various hydrocarbons such as methylbutene, cetane, cyclohexene and various ketones and ethers. The preferred hydroperoxide is cumene hydroperoxide. The level of the initiator utilized in the composition may be from 0.1 percent, conveniently from 1 to 3 percent.

The next component which has been thought to be useful in forming an anaerobic curing composition is a metal chelating agent. For instance, it is known that one of the mechanicisms by which anaerobic sealants function is that iron bolts upon which the sealant is applied positively catalyze the reaction. From that discovery, it was determined that metal ions should not be freely available in the anaerobic composition due to the tendancy to promote polymerization during storage of the composition. Thus, metal chelating agents are desirable components in the anaerobic curing composition at levels of from 0.01 to 1 percent, preferably from 0.03 to 0.1 percent by weight. Such metal chelating agents include soluble polycarboxylated polyamines such as the sodium derivatives of polycarboxylated alkylene diamines such as tetrasodium ethylene diamine tetraacetate. Other chelating agents which may be employed include materials such as o-aminophenol and 8-hydroxyquinoline. A suitable range from these materials is 0.01 to 2 percent, preferably 0.5 to 0.2 percent. A component which is not required in the present invention which, however, deserves some description due to its absence is the quinone inhibitor with an oxidation-reduction potential of 0.6 volt or less of the popular 1,4-naphthoquinone. Such compounds also referred as stabilzing inhibitors are those materials which provide a sink for the free radical. As discussed previously, the purpose of the stabilizing inhibitor is to scavenge those free radicals which would otherwise polymerize the reaction. Such materials, which as previously noted, are not desired in the present invention although they might be added in small amounts are quinones such as 1,4-naphthoquinone, beta-naphthoquinone and various derivatives thereof such as 2-methyl-1,4-benzoquinone or a 1,2 or 1,4 benzoquinone. Such materials should desirably not be present but can be tolerated up to 300 ppm, preferably not more than 200 ppm based on the total weight of the anaerobic composition. As previously noted, such components are not desired in the present invention, but should some slight stabilizing effect or other purpose be desired, such materials might be included.

The next group of components which is discussed in the present invention are accelerators. The purpose of the accelerator as previously described is to catalyze and thereby speed up the decomposition of the free radical initiator thereby promoting the polymerization. The first group of accelators which may be employed in the present invention are organic sulfimides which contain the group

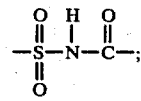

preferred sulfimides are those containing a cyclic backbone particularly benzoic sulfimide. The sulfimide accelerator when utilized in the present invention may be present at from 0.1 to 10 percent preferably from 1 to 4 percent by weight.

The second class of accelerators with which the present invention is concerned are a particular class of aromatic tertiary amines. It has been found in the present invention that certain aromatic tertiary amines do not require the presence of the quinone type inhibitors as previously described. The aromatic tertiary amines with which the present invention is concerned are first, organic aromatic tertiary amines, second, they must be meta substituted with respect to the amine and third, the tertiary structure must be limited to from 2 to 4 carbon atoms. In particular, such compounds are shown below:

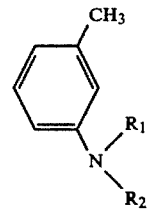

wherein $R_1$ and $R_2$ are selected from the group consisting of ethyl, n-propl, isopropyl, n-butyl, 1-methyl propyl and 2-methyl propyl as it was previously stated. Most preferably, the alkyl substitution of the toluidine compound has both components having the same alkyl substitutent, i.e., di-n-propyl. In particular, it has been found most preferable to utilize meta-diethyl toluidine.

The toluidine compound in the present invention is ordinarily used at a level of from about 0.01 to about 5 percent, preferably from about 0.3 to about 1.5 percent by weight. As previously noted, it is not necessary to utilize any quinone inhibitor when utilizing the toluidine accelerator. It has been found in side by side comparisons with compounds as close as the meta-dimethyl toluidine that the absence of a quinone inhibitor is fatal to the composition except where the particular class of dialkyl substituted toluidines with which the present invention is concerned are utilized.

The necessary ingredients utilized in the compositions of the present invention are combined in the common fashion in the examples.

The following are suggested embodiments of the present invention.

EXAMPLE 1

An anaerobic sealant composition is formed by combining the following ingredients.

| Tetraethyleneglycol dimethacrylate* | 412 parts |
| --- | --- |
| Cab-O-Sil EH5 silica | 8 |
| Cumene hydroperoxide | 9 |
| Composition A | 2 |
| Benzoic sulfimide | 9 |
| Diethyl-m-toluidine | 4 |
| Minor ingredients including dyes, flow control agent and fluorescent additive | 0.4 |

*The methacrylate monomer in this and the succeeding examples contains 80 ppm hydroquinone.

Composition A as referred to in this patent is a mixture of Versene 100, water and methanol in a ratio of 1:1:2 respectively. The Versene 100 is a 40 percent solution of tetrasodium ethylene diamine tetraacetate in water.

The composition is formed by combining 150 parts of the tetraethyleneglycol dimethacrylate with the silica and mixing for one hour at high speed. Thereafter, the remainder of the tetraethyleneglycol dimethacrylate is added and mixing is continued until a homogeneous system is achieved.

Thereafter, the mixture of the tetraethyleneglycol dimethacrylate and the silica is combined with the cumene hydroperoxide which is mixed until thoroughly dispersed in the system. Thereafter, the components of the composition A and the benzoic sulfimide are separately added sequentially and mixed until thoroughy dispersed in the system. Thereafter, the diethyl-m-toluidine and the minor components are added and mixing is continued for a period of one hour or longer as the system requires.

The product cures eminently well when applied to a nut upon which a bolt is sealed such that the conditions are anaerobic. The following data is also obtained. The gel time at 82 degrees C for the composition is greater than 20 minutes thus indicating a satisfactory shelf life for extended periods. The viscosity of the composition immediately upon adding all of the ingredients using a Brookfield #3 spindle at 20 rpm and 25 degrees C. is in the range of 500 to 1000 centipoise.

The fixture time on ⅜-16×1 nuts and bolts utilizing steel grade 2 is less than 60 minutes. The strength on the same nut and bolt as measured by breakaway torque after cure for 24 hours is in the range of 150 to 350 inch pounds.

EXAMPLE II

A second anaerobic adhesive composition is formed by combining the following ingredients.

| Tetraethyleneglycol dimethacrylate | 280 parts |
| --- | --- |
| Cab-O-Sil EH5 silica | 7 |
| Dibutyl phthalate | 93 |
| Cumene hydroperoxide | 9 |
| Composition A | 2 |
| Benzoic Sulfimide | 4 |
| Diethyl-m-toluidine | 4 |
| Minor components including dyes, flow control agent and fluorescent additive | 0.33 |

The components of this example are combined substantially as previously disclosed with the exception that the tetraethyleneglycol dimethacrylate is divided into two parts rather than the ratio given in the previous example. The dibutyl phthalate is added and mixed into the composition prior to the addition of the cumene hydroperoxide.

The compositions of this example perform excellently as an anaeorbic adhesive on nuts and bolts. The following test perameters are given. The gel time at 82 degrees C. is greater than 20 minutes indicating high degree of stability. The viscosity as measured in Example I is from 900 to 1300 centipoise. Fixture time on the nuts and bolts as described in Example I is less than 60 minutes with the breakaway torque being in the range of from 40 to 100 inch pounds.

EXAMPLE III

An anaeorbic adhesive composition is prepared containing the following ingredients.

| Tetraethyleneglycol dimethacrylate | 230 parts |
| --- | --- |
| Cab-O-Sil EH5 | 8 |
| Dibutyl phthalate | 123 |
| Cumene hydroperoxide | 8 |
| Composition A | 2 |
| Benzoic Sulfimide | 4 |
| Diethyl-m-toluidine | 4 |
| Minor components including dyes, flow control agent and fluorescent additive | 0.24 |

The components are added as described in the previous example with the exception that 60.8 percent of the tetraethyleneglycol dimethacrylate is added initially.

This composition also performs eminently well as an anaerobic adhesive and has the following parameters. The gel time at 82 degrees C. is greater than 20 minutes while the viscosity as previously measured is in the range of from 700 to 1300 centipoise.

The fixture time as previously defined is less than 60 minutes. Breakaway torque is in the range of 20 to 60 inch pounds.

EXAMPLE IV

An anaerobic sealant suitable for forming a gasket on metal surfaces is prepared as follows.

| The ingredients in this example are: | |
| --- | --- |
| Tetraethyleneglycol Dimethacrylate | 305.5 parts |
| Cab-O-Sil EH5 Silica | 1.93 |

| | |
|---|---|
| Cumene Hydroperoxide | 7 |
| Composition A | 2 |
| Benzoic Sulfimide | 11 |
| Diethyl-m-toluidine | 3 |
| Thixatrol ST thickener | 20 |
| Minor components including dyes, flow control agent and fluorescent additive | 0.3 |

The components in this example are prepared by adding one-half of the tetraethyleneglycol dimethacrylate and the silica and thereafter thoroughly mixing. Thereafter, the remainder of the tetraethyleneglycol dimethacrylate is added into this mixture and mixing is continued until a homogenous system is obtained.

Thereafter, separately, the cumene hydroperoxide is added and mixed until thoroughly dispersed in the system followed by the ingredients in Composition A which are also thoroughly mixed into the system.

The benzoic sulfimide and the diethyl-m-toluidine are each added separately and mixed into the system thoroughly. Thereafter, the remaining ingredients are added and mixed until an even system is obtained.

According to the previous examples, the components following the second mixing step have a gel time at 82 degrees C. of greater than 20 minutes. The fixture time using steel lapshears in cross wise fashion is less than 60 minutes. The viscosity as measured by a Brookfield viscometer at 25 degrees C. is in the range of 400,000 to 100,000 centipoise.

EXAMPLE V

A second anaerobic sealant product is prepared by utilizing 350 parts of the composition of the previous example and 80 parts of the tetraethyleneglycol dimethacrylate. The mixing time is at high speed for approximately 30 minutes at a temperature maintained between 25 and 30 degrees C.

This product performs eminently well as an anaerobic sealant using steel lapshears crosswise curing in less than 60 minutes. The gel time of the product measured at 82 degrees C. is greater than 20 minutes. The viscosity is measured by a Brookfield viscometer at 25 degrees C. is in the range from 10,000 to 25,000 centipoise.

EXAMPLE VI

As a further embodiment of the present invention, an anerobic sealant is formed by utilizing 350 parts of the composition of Example IV which is then combined 225 parts of the tetraethyleneglycol dimethacrylate. Mixing is accomplished as in Example V.

This product functions eminently well as an anaerobic sealant showing a fixture time using steel lapshears in a crosswise fashion below 60 minutes. The gel time at 82 degrees C. is greater than 20 minutes while the viscosity using a Brookfield viscometer at 25 degrees C. is in the range of 3000 to 6000 centipoise.

EXAMPLE VII

Another anaerobic sealant composition is prepared by forming the following composition.

| | |
|---|---|
| Tetraethyleneglycol dimethacrylate | 310.24 parts |
| Cab-O-Sil EH5 Silica | 1.76 |
| Cumene Hydroperoxide | 7 |
| Composition A | 2 |
| Benzoic sulfimide | 11 |
| Diethyl-m-toluidine | 3 |
| Thixatrol ST thickener | 26 |
| Minor components including dyes, flow control agent and fluorescent additive | 0.3 |

This composition is prepared according to the previous anaerobic sealant compositions with the exception that 9.75 parts of the tetraethyleneglycol dimethacrylate are previously mixed with the silica. Thereafter, the composition is mixed with the remaining tetraethyleneglycol dimethacrylate. The remaining components are added and mixed in according to the previous examples.

This product has a gel time at 82 degrees C. after mixing in the total amount of tetraethyleneglycol dimethacrylate of greater than 20 minutes while the viscosity is measured by a Brookfield viscometer at 25 degrees C. in the range of from 500,000 to 1,000,000 centipoise.

EXAMPLE VIII

A side by side composition to demonstrate the lack of the requirement of the unwanted stabilizing inhibitor is made in comparision to Example I of U.S. Pat. No. 4,038,475.

The following components are combined as described in the aforementioned patent.

TABLE I

| INGREDIENTS | 1 | 2 | 3 | 4 | 5 |
|---|---|---|---|---|---|
| Polyethyleneglycol dimethacrylate | 94.9 | 94.9 | 94.9 | 94.9 | 94.9 |
| Cumene hydroperoxide | 3 | 3 | 3 | 3 | 3 |
| 10% Na4 EDTA in methanol/water | — | — | 0.3 | 0.3 | 0.3 |
| Benzoic sulfimide | 1.6 | 1.6 | 1.6 | 1.6 | 1.6 |
| Dimethyl-p-toluidine | 0.5 | — | — | — | 0.5 |
| Diethyl-m-toluidine | — | 0.5 | 0.5 | — | — |
| Na4 EDTA | 0.03 | 0.03 | — | — | — |
| 28% ammonia | 0.6 | 0.6 | — | — | — |
| Dimethyl-m-toluidine | — | — | — | 0.5 | — |

The above compositions are then tested according to Table II shown below.

TABLE II

| TESTS | | | | | |
|---|---|---|---|---|---|
| 1. Stability | Unstable | Good | Good | Unstable | Unstable |
| 2. Gel time at 82° C., minutes | 4 | 200+ | 25 | 0 | 2 |
| 3. Gel time at room temp hours | 2 | 24+ | 24+ | 1 | 2 |
| 4. Cure (observed) | — | Fair | Good | — | — |
| 5. Fixture time on steel Grade II ⅜ × 16 in. nut & bolts, minutes | — | 60 | 15 | — | — |

The above tests show that the compositions of the present invention in the absence of a stabilizing inhibitor are quite useful in forming anaerobic adhesives whereas the unstabilized prior art compositions do not have a practical utility due to the short stability life of the product.

What is claimed is:

1. An anaerobic curing composition comprising a compound capable of curing under anaerobic conditions, the improvement thereon comprising including in the composition a member selected from the group consisting of a meta-dialkyl substituted toluidine wherein the alkyl groups are selected from the group consisting of ethyl, n-propyl, isopropyl, n-butyl, 1-methyl propyl and 2-methyl propyl and mixtures thereof said composition being substantially free of a stabilizing inhibitor said inhibitor being present at not more than 300 ppm based on the total weight of the composition, wherein the inhibitor has an oxidation-reduction potential of 0.6 volt or less.

2. The composition of claim 1 wherein the meta-dialkyl substituted toluidine is present at from about 0.01 percent to about 5 percent by weight.

3. The composition of claim 1 wherein the meta-dialkyl substituted toluidine compound has both alkyl substituents identical.

4. The composition of claim 1 containing from about 0.1 to about 10 percent by weight of a sulfimide accelerator.

5. The composition of claim 1 additionally containing from about 0.01 to about 1 percent by weight of a chelating agent capable of complexing iron ions.

6. The composition of claim 3 wherein the meta-dialkyl substituted toluidine is the diethyl compound.

7. The composition of claim 1 wherein the compound is present at from about 50 percent to about 99.5 percent by weight.

8. The composition of claim 1 containing as a free radical initiator cumene hydroperoxide from 0.1 percent to 10 percent by weight.

9. The composition of claim 4 wherein the sulfimide is benzoic sulfimide.

10. The composition of claim 1 wherein the compound is a polymerizable polyacrylate ester.

11. The composition of claim 1 containing as a free radical initiator a hydroperoxide at from 0.1 to 10 percent by weight.

12. The composition of claim 1 containing from about 0.5 percent to about 10 percent by weight silica.

* * * * *